(12) United States Patent
Tse et al.

(10) Patent No.: US 7,920,346 B2
(45) Date of Patent: Apr. 5, 2011

(54) METHOD FOR TESTING PERFORMANCE OF A MAGNETIC HEAD SLIDER

(75) Inventors: Man Tse, Hong Kong (CN); CheukWing Leung, Hong Kong (CN); WaSze Tsang, Hong Kong (CN)

(73) Assignee: Sae Magnetics (H.K.) Ltd., Hong Kong (CN)

( * ) Notice: Subject to any disclaimer, the term of this patent is extended or adjusted under 35 U.S.C. 154(b) by 310 days.

(21) Appl. No.: 12/153,619

(22) Filed: May 21, 2008

(65) Prior Publication Data

US 2009/0290246 A1 Nov. 26, 2009

(51) Int. Cl.
*G11B 27/36* (2006.01)
(52) U.S. Cl. .......................................... 360/31
(58) Field of Classification Search ............... 360/75, 360/69, 25, 31, 97.01, 110
See application file for complete search history.

(56) References Cited

U.S. PATENT DOCUMENTS

| | | | |
|---|---|---|---|
| 5,673,156 A * | 9/1997 | Chen et al. | 360/97.01 |
| 5,991,113 A * | 11/1999 | Meyer et al. | 360/75 |
| 7,119,979 B2 * | 10/2006 | Fong et al. | 360/75 |
| 7,180,692 B1 * | 2/2007 | Che et al. | 360/31 |
| 7,215,495 B1 * | 5/2007 | Che et al. | 360/31 |
| 7,292,401 B2 * | 11/2007 | Shen et al. | 360/69 |
| 2005/0174665 A1 * | 8/2005 | Zhang et al. | 360/25 |

* cited by examiner

*Primary Examiner* — Fred Tzeng
(74) *Attorney, Agent, or Firm* — Nixon & Vanderhye, P.C.

(57) ABSTRACT

A method for testing performance of a magnetic head slider includes the steps of: (1) rotating the disk and positioning the slider over the rotating disk at an initial fly-height; (2) exciting the fly-height actuator to make the slider touch the disk and recording a touch down spacing of the read head of the slider; (3) backing off the slider at a predetermined backoff amount from the disk; (4) testing dynamic performance of the slider to obtain a reference value which is related to the spacing between the disk and the slider; (5) varying the initial fly-height of the slider; (6) repeating the steps (2) to (4) with the backoff amount fixed; and (7) calculating a dynamic fly-height gamma ratio based at least in part on the recorded touch down spacing and the obtained reference values.

9 Claims, 9 Drawing Sheets

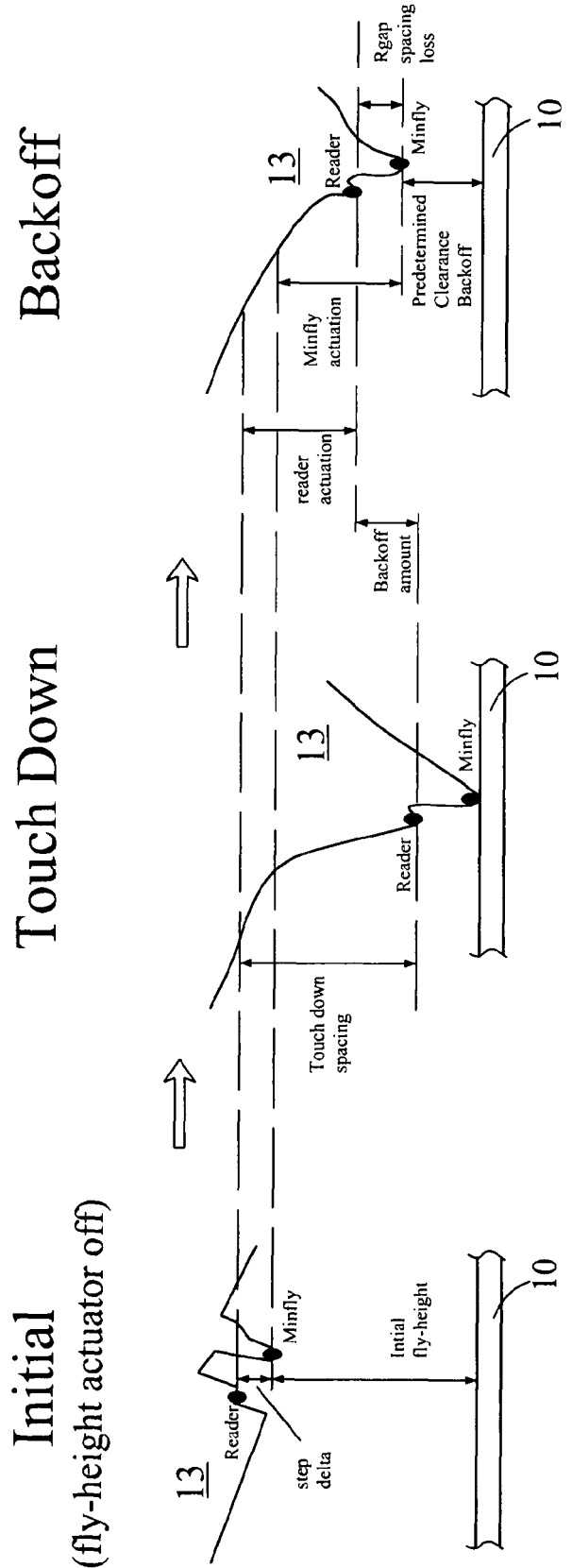

METHOD FOR TESTING PERFORMANCE OF A MAGNETIC HEAD SLIDER

FIELD OF THE INVENTION

The present invention relates to an information recording disk drive device with a fly-height actuator for controlling the spacing between the slider and the disk, and more particularly to a method for testing performance of a magnetic head slider used in the disk drive device in actual flying case which greatly benefits on slider design in optimizing both head-disk interference (HDI) and performance.

BACKGROUND OF THE INVENTION

Disk drive devices are information storage devices that use magnetic media to store data and a movable slider with a read/write head positioned over the magnetic media to selectively read data from and write data to the magnetic media.

FIG. 1a illustrates a typical disk drive device and shows a magnetic disk 101 mounted on a spindle motor 102 for spinning the disk 101. A voice coil motor arm 104 carries a head gimbal assembly (HGA) 100 that includes a slider 103 incorporating a read/write head. A voice-coil motor (VCM, not labeled) is provided for controlling the motion of the motor arm 104 and, in turn, controlling the slider 103 to move from track to track across the surface of the disk 101, thereby enabling the read/write head to read data from or write data to the disk 101. In operation, a lift force is generated by the aerodynamic interaction between the slider 103 and the spinning magnetic disk 101. The lift force is opposed by equal and opposite spring forces applied by the HGA 100 such that a predetermined fly-height above the surface of the spinning disk 101 is maintained over a full radial stroke of the motor arm 104.

FIG. 1b illustrates a perspective view of the slider shown in FIG. 1a in a bottom view. As illustrated, a magnetic read/write head 116, which is used for realizing data reading/writing operation of the slider 103 relative to the disk 101, is formed on one side surface of the slider 103. The slider 103 has an air bearing surface (ABS) 117 facing to the disk 101. When the disk drive device is in operation, an aerodynamic interaction is generated between the ABS 117 of the slider 103 and the rotary disk 101 in a high speed, thus making the slider 103 floating over the disk 101 dynamically to perform data reading/writing operation.

The clearance or spacing between the slider and the disk surface, concretely between a "minfly point" of the slider and the disk surface, is called fly-height, wherein the "minfly point" of the slider is the point which most closes to the disk surface. The flying dynamics of the slider and the fly-height are influenced by factors such as the rotation speed of the disk, the aerodynamic shape of the slider's ABS, the load force applied to the slider by the suspension, and the pitch and roll torques applied to the slider by the suspension.

Disk drives have been proposed to use a fly-height actuator for changing the spacing between the slider and the disk surface. One type of fly-height actuator is a thermal actuator with an electrically-resistive heater located on the slider near the read/write head. When current is applied to the heater, the heater expands and causes the read/write head to "protrude" and thus move closer to the disk surface. Other fly-height actuators for moving the read/write head relative to the slider include electrostatic micro-actuators and piezoelectric actuators. Another type of fly-height actuator, also based on thermal, electrostatic or piezoelectric techniques, changes the head-disk spacing by altering the air-flow or the shape of the slider's ABS. The clearance between the slider and the disk can be controlled and maintained by the above-mentioned fly-height actuators.

Due to the recent trend of high capacity, high density, and compact disk drive devices, there has been a corresponding increase in bit density in a tangential direction measured in bits-per-inch (BPI) and track density in a radial direction measured in tracks-per-inch (TPI), thereby requiring more delicate operations relative to the control of the disk drive devices.

Though the clearance between the slider and the disk can be maintained by the fly-height actuator, the spacing between the read head and the disk surface can not be kept the same because the read head should not be the "minfly point" as it is too sensitive towards mechanical impact. Accordingly, even maintained in the same clearance, different sliders have different performance because of their different read head design.

Typically, to judge the slider, DFH (dynamic fly-height) gamma ratio is a critical parameter that describes the motion of the mechanical minfly point of the slider compared to the read head movement. To clarify the DFH gamma ratio, a term "Rgap spacing loss" is introduced that means the spacing between the read head and the minfly point of the slider when the slider is flying over a rotating disk. The Rgap spacing loss is sensitive to the performance of the slider, especially the read performance. The lower the numerical gamma ratio value is, the larger the gap between the minfly point and the read head is, that is to say, the larger the Rgap spacing loss is. Slider design objective is to achieve a gamma ratio as close as possible to 1. A gamma ratio of 1 would be ideal for tribology and magnetic performance because it keeps the gap between the read head and the minfly point of the slider at a constant value so as to make the spacing between the read head and the disk to be a constant value. Therefore, testing of the DFH Gamma ratio can provide some data on how to improve or optimize the slider.

In the prior art, we can easily model or measure the DFH gamma ratio using AFM (Atomic Force Microscope) or Wyko-DFH protrusion profile. However, they measure the slider in the static condition or without flying media cooling effect, so the gamma ratio measured by the conventional method can not reflect the slider in actual rotating disk case and can not provide accurate data for optimizing the slider. Another current available testing method of the DFH gamma ratio is using resolution to roughly represent the Rgap spacing. Generally, the resolution value is calculated by the following equation:

RESM=TAA(MF)/TAA(LF)

wherein TAA(MF) (Track Average Amplitude of Middle Frequency) is the amplitude of readback signal from the disk under the condition of middle frequency writing, while TAA (LF) (Track Average Amplitude of Low Frequency) is the amplitude of readback signal from the disk under the condition of low frequency writing. However, resolution can be affected by many factors such as reader shield gap and initial PTR (protrude) recess level. Therefore, just using resolution to estimate DFH gamma ratio is not adequate and easily mixes with other factors. The DFH gamma ratio measured by this method is also not accurate.

Hence, it is desired to provide an improved method for testing the DFH gamma ratio of the slider in actual flying case and more accurately.

SUMMARY OF THE INVENTION

Accordingly, an objective of the present invention is to provide a method for testing performance of a magnetic head slider used in the disk drive device in actual flying case more accurately which can greatly benefit on head design to optimize both HDI and performance.

To achieve the above-mentioned objective, the present invention provides a method for testing performance of a magnetic head slider used in a disk drive unit having a rotatable disk, a read head incorporated in the slider for reading data from the disk, and a fly-height actuator for changing spacing between the disk and the slider. The method comprises:

(1) rotating the disk and positioning the slider over the rotating disk at an initial fly-height;

(2) exciting the fly-height actuator to make the slider touch the disk and recording a touch down spacing of the read head of the slider;

(3) backing off the slider at a predetermined backoff amount from the disk;

(4) testing dynamic performance of the slider to obtain a reference value which is related to the spacing between the disk and the slider;

(5) varying the initial fly-height of the slider;

(6) repeating the steps (2) to (4) with the backoff amount fixed; and (7) calculating a dynamic fly-height gamma ratio based at least in part on the recorded touch down spacing and the obtained reference values.

In an embodiment of the method according to the present invention, the step (2) is performed by applying an actuator power to the fly-height actuator, and the step (3) is performed by lowering the actuator power by an amount corresponding to the backoff amount.

Alternatively, the step (5) is performed by means of: adjusting the slider's Load/Gram, adjusting attitude of the slider, adjusting z-height of the slider, varing an air bearing surface pattern of the slider, and/or varying rotation speed of the disk.

In another embodiment of the method according to the present invention, calculating the dynamic fly-height gamma ratio is performed according to the following equation:

Delta[reference value]=$K$*Delta[touch down spacing]
*[1/DFH gamma ratio−1]

wherein Delta [reference value] denotes the reference value change, K denotes an experimental coefficient, Delta [touch down spacing] denotes the touch down spacing change, and "DFH gamma ratio" denotes the dynamic fly-height gamma ratio.

In still another embodiment of the method of the present invention, the step (4) is resolution measurement, the reference value is resolution value, and the resolution value is calculated by the amplitude ratio of middle frequency and low frequency.

Preferably, the value of the coefficient K is obtained by spacing sensitive experiment on resolution and the coefficient K is 2.

In still another embodiment of the method of the present invention, the reference value is pulse-width value.

Alternatively, the fly-height actuator is located on the slider and is one of a thermal actuator, an electrostatic actuator and a piezoelectric actuator.

In comparison with the prior art, the present method tests the DFH gamma ratio of the slider when it is flying over a rotating disk, and uses the change of resolution instead of absolute resolution value, and as the reader shield gap and initial PTR recess level are giving a constant offset of resolution but not contribute to the change of resolution with varying initial fly-height, so the tested DFH gamma ratio according to the present invention is accurate without other factors. Thus, the present method can clearly identify and differentiate out DFH gamma ratio effect in flying media case and, in turn, greatly benefit on slider design in optimizing both head-disk interference (HDI) and performance.

Other aspects, features, and advantages of this invention will become apparent from the following detailed description when taken in conjunction with the accompanying drawings, which are a part of this disclosure and illustrate, by way of example, principles of this invention.

BRIEF DESCRIPTION OF THE DRAWINGS

The accompanying drawings facilitate an understanding of the various embodiments of this invention. In such drawings:

FIG. 1b is a perspective view of a slider of the disk drive device shown in FIG. 1a;

FIGS. 4a-4c are schematic views showing the process of adjusting a fly-height of the slider flying over the disk from an initial fly-height to a predetermined clearance;

DETAILED DESCRIPTION OF ILLUSTRATED EMBODIMENTS

Figure 1A:
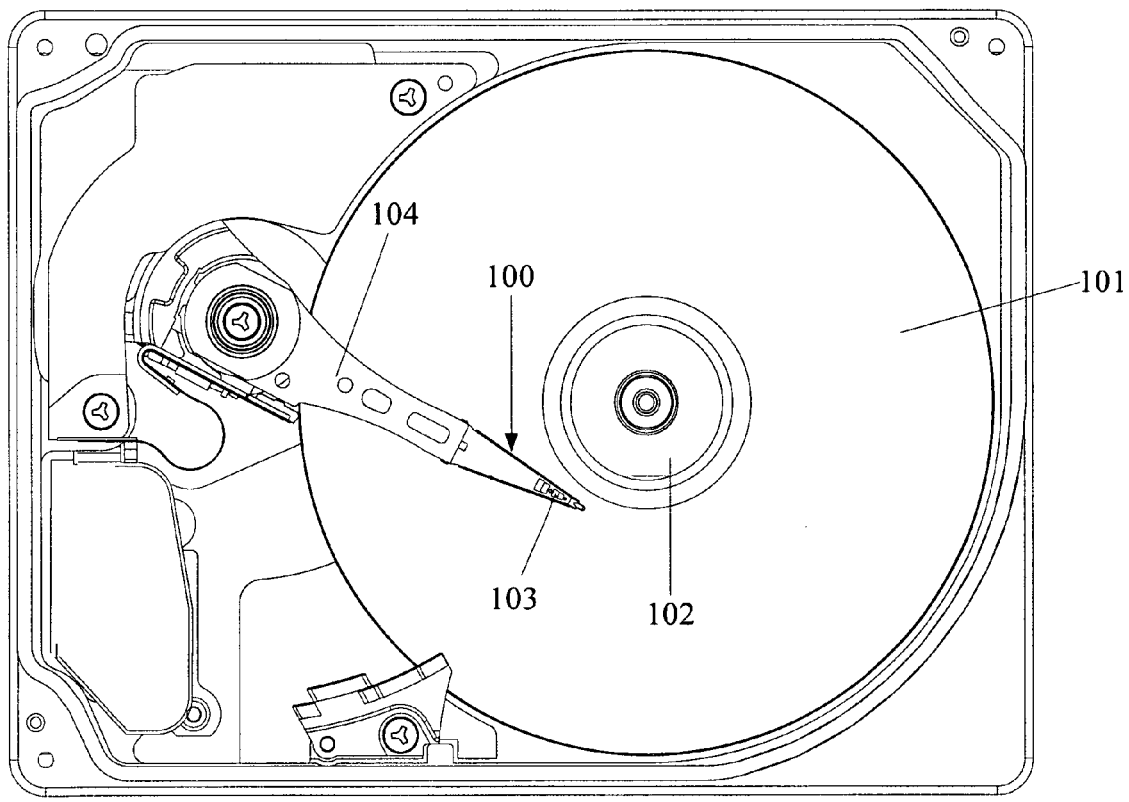
FIG. 1a is a perspective view of a conventional disk drive device.
Figure 1B:
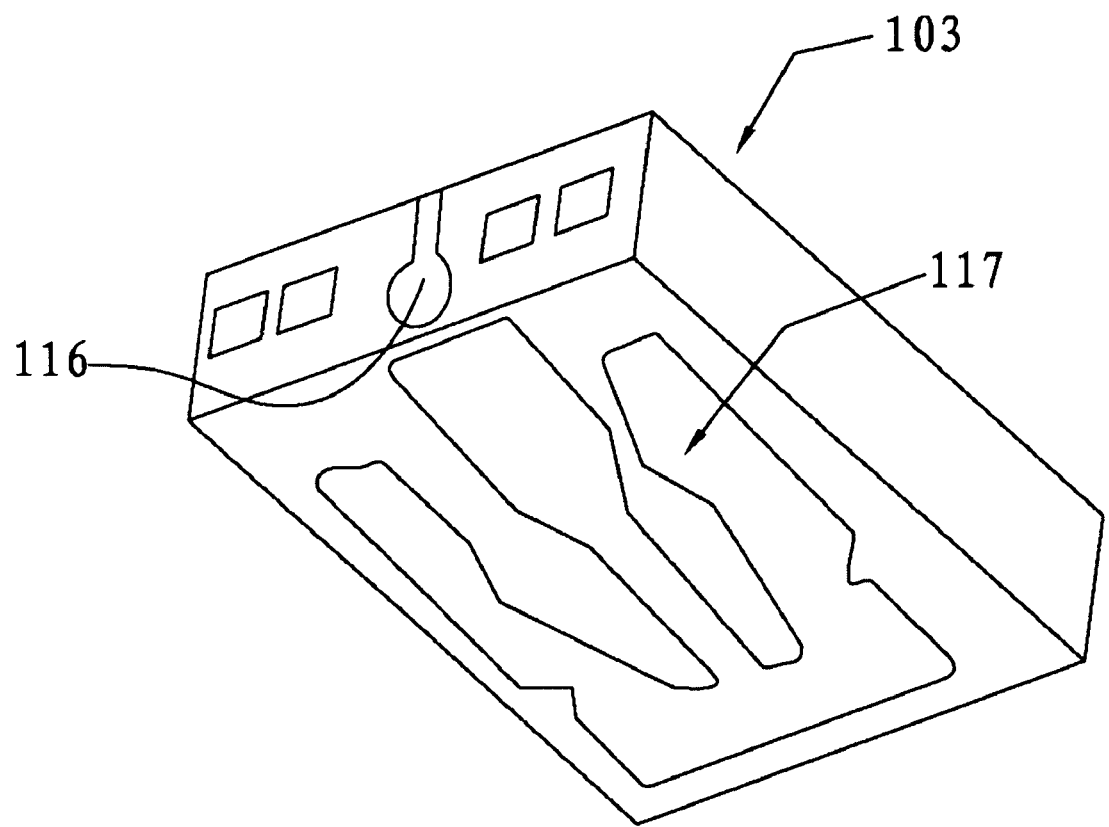

Various preferred embodiments of the invention will now be described with reference to the figures, wherein like reference numerals designate similar parts throughout the various views. As indicated above, the invention is directed to a method for testing performance of a magnetic head slider used in the disk drive device in actual flying case more accurately so as to get a realistic DFH gamma ratio, thereby to optimize the HDI and the performance of the disk drive.

Figure 2:
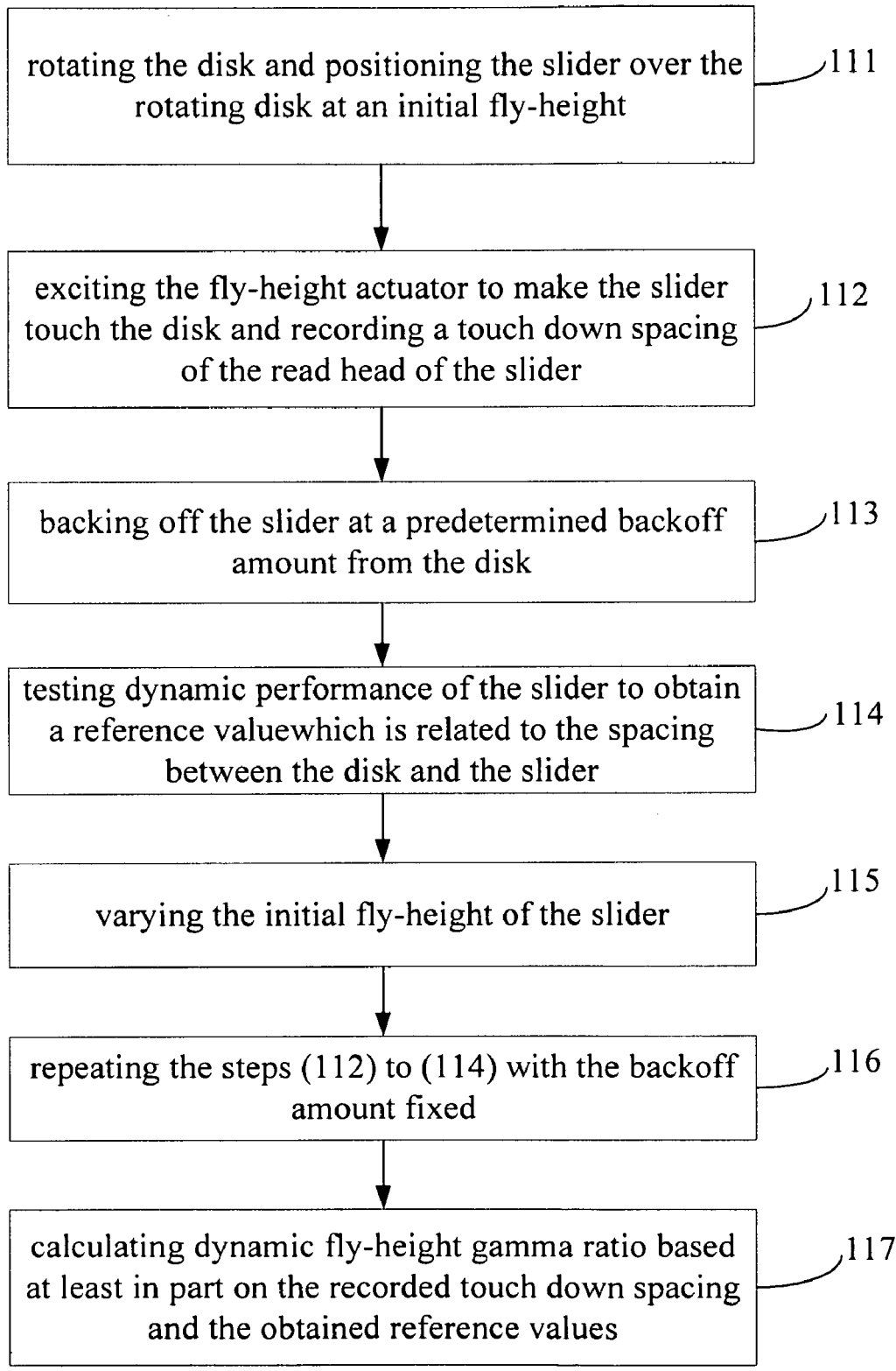
FIG. 2 is a flow chart illustrating a method for testing a DFH gamma ratio of a slider according to one embodiment of the present invention.

Referring to FIG. 2, the method for testing performance of a magnetic head slider used in a disk drive device in actual flying case comprises the steps of: (111) rotating the disk and positioning the slider over the rotating disk at an initial fly-height; (112) exciting the fly-height actuator to make the slider touch the disk and recording a touch down spacing of the read head of the slider; (113) backing off the slider at a predetermined backoff amount from the disk; (114) testing dynamic performance of the slider to obtain a reference value which is related to spacing between the disk and slider; (115) varying the initial fly-height of the slider; (116) repeating the steps (112) to (114) with the backoff amount fixed; and (117)

calculating a dynamic fly-height gamma ratio based at least in part on the recorded touch down spacing and the obtained reference values.

Figure 3:
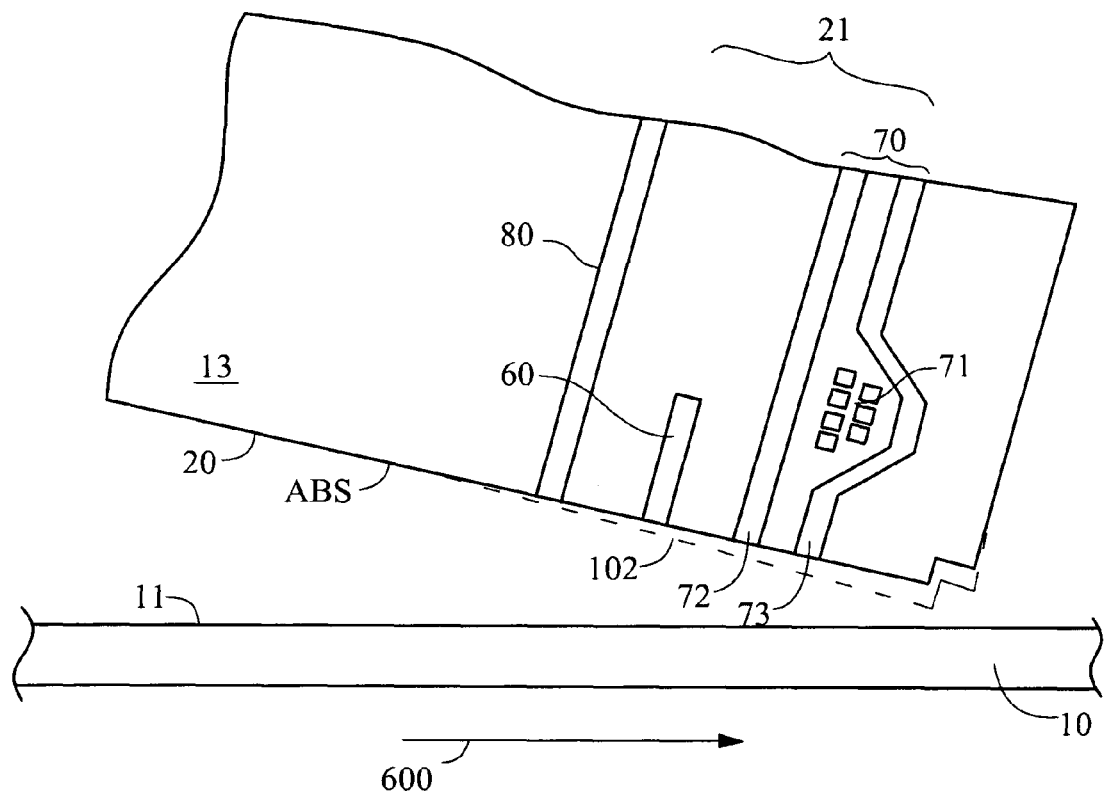
FIG. 3 is a sectional view of an end portion of a slider flying above a disk surface and shows a thermal fly-height actuator, a read head and a write head on the slider.

FIG. 3 is a sectional view of an end portion of a slider flying above a disk surface. The rotation of the disk 10 in the direction of arrow 600 generates an air bearing between the ABS of the slider 13 and the surface 11 of the disk 10. During operation of the disk drive, the air bearing counterbalances the slight spring force of the suspension and supports the slider 13 off and slightly away from the disk surface 11 by a small, substantially constant spacing, that is the fly-height of the slider 13. FIG. 3 also shows the read/write head 21, i.e., a MR read head 60 and write head 70, on the slider 13. The write head 70 is an inductive write head with coil 71 located between the two write poles 72, 73.

The slider also includes a fly-height actuator for changing the spacing between the read/write head 21 and the disk surface 11. The type of fly-height actuator shown in FIG. 3 is a thermal actuator with an electrically-resistive heating element or heater 80 electrically connected to and controlled by a fly-height controller (FHC) (not shown). FHC is a power source that controls the amount of current to the heater 80, such as by controlling the settings of a variable resistor. When current is applied to the heater 80, the heater 80 expands and causes protrusion (PTR) of the read/write head 21, as shown by the dashed line 102, which moves the read/write head 21 closer to the disk surface 11.

The fly-height actuator can also be an electrostatic actuator and a piezoelectric actuator. Taken the thermal actuator as an example, the testing method of the present invention will be described in detail in the following text.

The term "touch down" in the text means that the minfly point of the slider 13 is in contact with the disk surface 11, and the term "touch down spacing" denotes the movement of the reader when the slider 13 is in touch down state.

FIGS. 4a-4c illustrate the steps (111)-(113) of the method, taken the slider and the disk shown in FIG. 3 as an example. In FIGS. 4a-4c, Point Reader represents the read head 60 and point Minfly represents the mechanical minfly point of the slider. As shown in FIG. 4a, the slider 13 is positioned over the rotating disk 10 at an initial fly-height with the fly-height actuator off, which means the heater power is zero in this state. Next, apply current to the heater 80 to make the slider's minfly point touch the disk 10 and recording the touch down spacing of the read head 60, which is the change of the read head's position, as touch down spacing (1). Then, lower the current applied to the heater 80 by an amount to make the slider 13 back off at a predetermined backoff amount, for example 1 nm. The fly-height actuator must be accurately calibrated so that the backoff amount of the slider 13, that is the displacement of the reader, can be controlled. The calibration requires that the value of the actuator power that results in the slider's touch down be known. Since the fly-height actuator is a thermal actuator with an electrically-resistive heater 80 located on the slider 13 near the head 21, this control signal value is the value of heater power that results in touch down. Then according to a sensitivity of the head-disk spacing to the heater power value, the lowering amount of the heater power correlating to the predetermined backoff amount of the slider can be calculated. Change the heater power according to the calculated value for maintaining the slider to fly over the disk at a predetermined fly-height. The method for controlling the slider touch down and maintaining the slider at a predetermined fly-height is disclosed in U.S. Pat. No. 7,180,692 which is incorporated herein for reference.

Now the slider 13 is flying over the rotating disk 10 at a fixed fly-height and in this condition testing the dynamic performance of the slider 13 to obtain a reference value M1, which is step (114). As an exemplary embodiment, resolution value is used as the reference value.

Next, change the initial fly-height of the slider by one way of adjusting the slider's Load/Gram, attitude, z-height, and/or the rotation speed of the disk, which is step (115), and repeat the steps (112) and (114) to obtain another touch down spacing value, recorded as touch down spacing (2), and another reference value M2, which is step (116).

Finally, calculating the DFH gamma ratio based on the reference values M1, M2 and the touch down spacing values with the equation (1):

$$K*[\text{touch down spacing}(1) - \text{touch down spacing}(2)]*$$
$$\left(\frac{1}{DFH \text{ gamma ratio} - 1}\right) = M1 - M2$$

namely, $K*\text{Delta [touch down spacing]}*\left(\frac{1}{DFH \text{ gamma ratio}-1}\right)=$ Delta [reference value]

Now the principle and the deduction of the above-mentioned equation (1) are described in detail hereafter.

The equation (1) is deducted from the Rgap spacing loss equation which is based on the well-known Wallace spacing loss relationship. As illustrated in FIGS. 4a-4c, $$Rgap \text{ spacing loss} = (minfly \text{ actuation} - reader \text{ actuation}) + \text{step delta} \quad (2)$$

Since $DFH$ gamma ratio $= reader$ actuation/$minfly$ actuation, as defined, so $Rgap$ spacing loss =

(reader actuation/$DFH$ gamma ratio − reader actuation) + step delta =

$(1/DFH$ gamma ratio − 1)*reader actuation + step delta

Figure 5B:
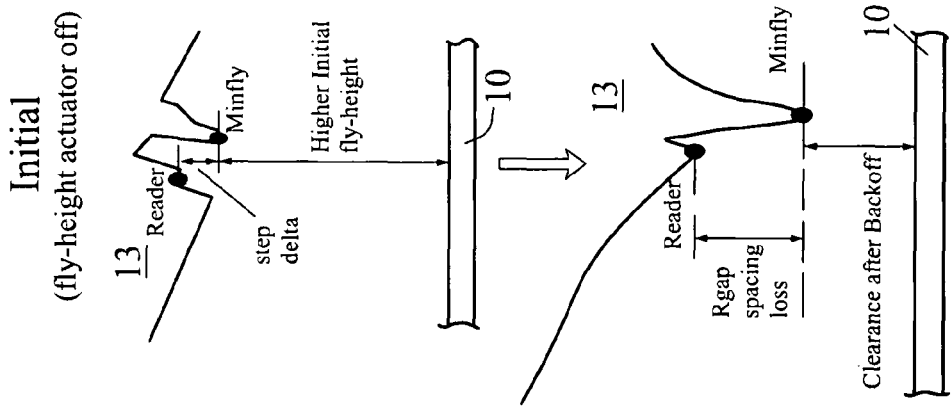
FIGS. 5a-5b are schematic views illustrating the relationship of the Rgap spacing loss and the initial fly-height of the slider under the same backoff amount.
Figure 5A:
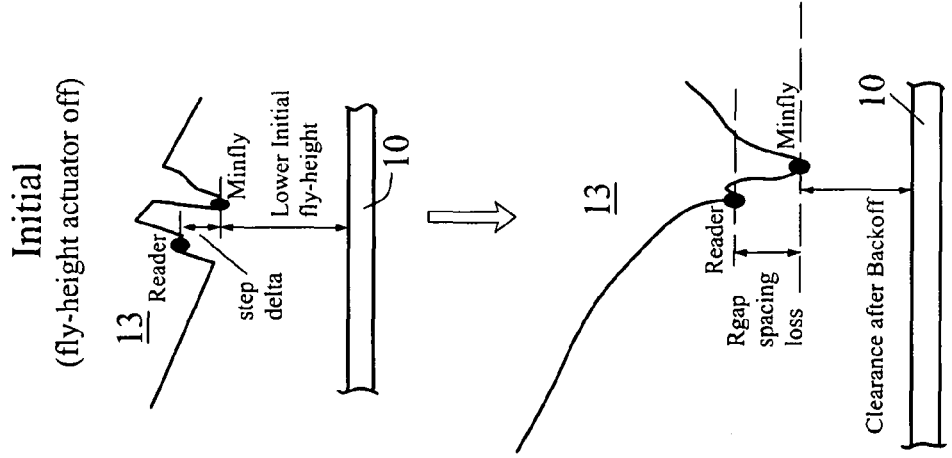
Figure 5C:
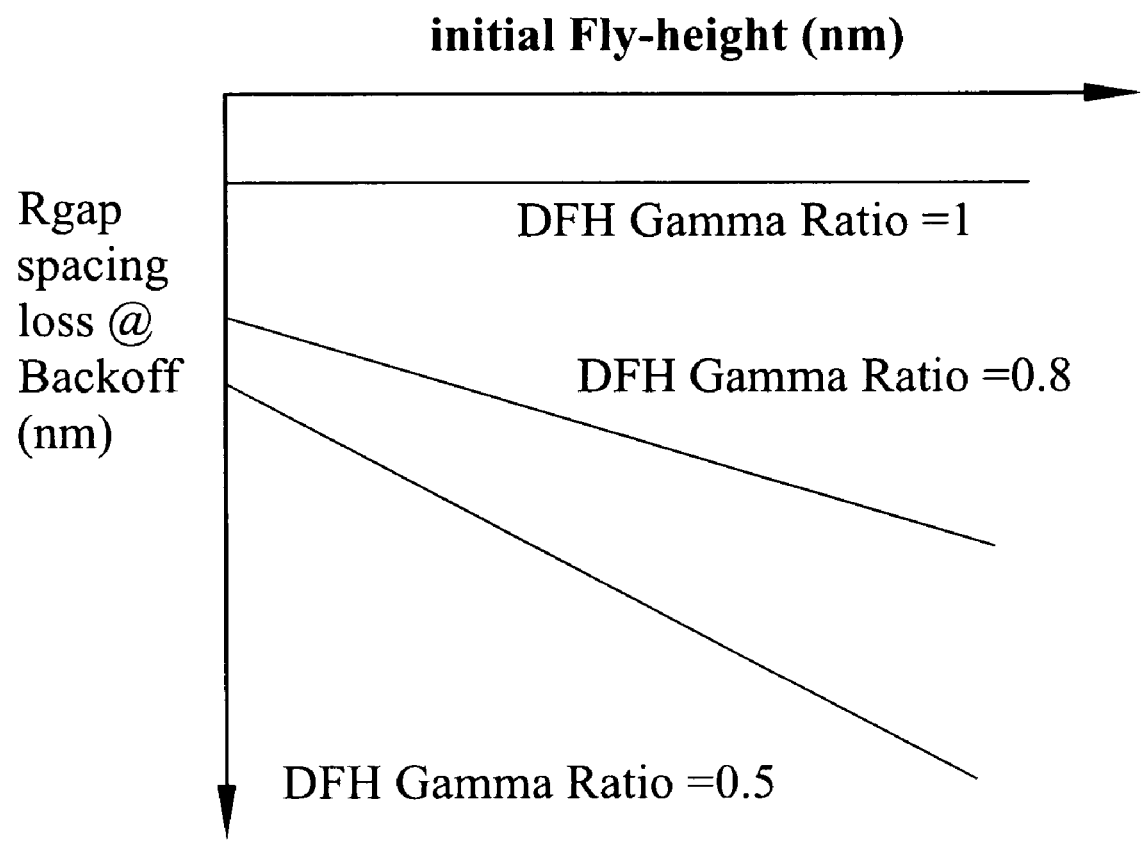
FIG. 5c is a schematic view illustrating the relationship of the Rgap spacing loss and the initial fly-height of the slider with different DFH gamma ratio.

From the foregoing equation, it can be seen that if the minfly point is the reader, the DFH gamma ratio is equal to 1, and Rgap spacing loss is equal to step delta. Step delta is a constant value and does not depend on the initial fly-height of the slider, so the Rgap spacing loss is a constant and does not depend on the initial fly-height. This is ideal. Also referring to FIGS. 5a-5b, if the DFH gamma ratio is less than 1, the higher the initial fly-height of the slider 13 is, the larger Rgap spacing loss is, even with the same clearance between the minfly point of the slider 13 and the disk 10. That is to say, if the Reader is not the mechanical minfly point of the slider, Rgap spacing loss depends on the reader actuation and, in turn, depends on the initial fly-height of the slider because the reader actuation depends on the initial fly-height of the slider. This situation will more severe if DFH gamma ratio is more far from 1, as shown in FIG. 5c.

At fixed backoff amount, $R$gap spacing loss=[touch down spacing−backoff amount]*[1/DFH gamma ratio−1]+step delta wherein the step delta is a constant value.

At a first initial fly-height, $R$gap spacing loss (1)=[touch down spacing (1)−backoff amount]*[1/DFH gamma ratio−1]+step delta    (3a)

At a second initial fly-height which is different from the first initial fly-height, $$R\text{gap spacing loss (2)} = [\text{touch down spacing (2)} - \text{backoff amount}]*[1/\text{DFH gamma ratio} - 1] + \text{step delta} \quad (3b)$$

Thus, $$\text{Delta}(R\text{gap spacing loss}) = [\text{Delta (touch down spacing)}]*[1/\text{DFH Gamma ratio} - 1] \quad (4)$$

wherein Delta [Rgap spacing loss]=Rgap spacing loss(2)−Rgap spacing loss (1), and Delta [touch down spacing]=touch down spacing (2)−touch down spacing (1).

On the other hand, the change of the Rgap spacing loss is related to the change of the reference values. The relation is:

$$K*\text{Delta}[R\text{gap spacing loss}] = \text{Delta}[\text{reference value}] \quad (5)$$

wherein K denotes an experimental coefficient depends on the fixed backoff amount of the slider and the kind of the reference value.

Figure 6A:
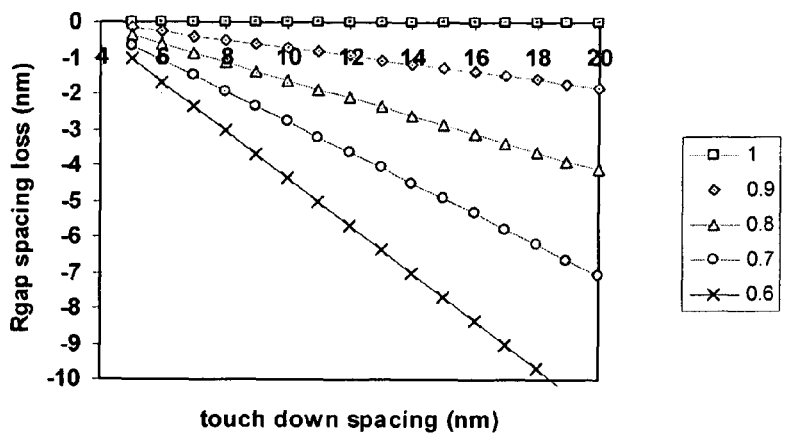
FIG. 6a is a data diagram showing the relationship of the Rgap spacing loss and the touch down spacing.
Figure 6B:
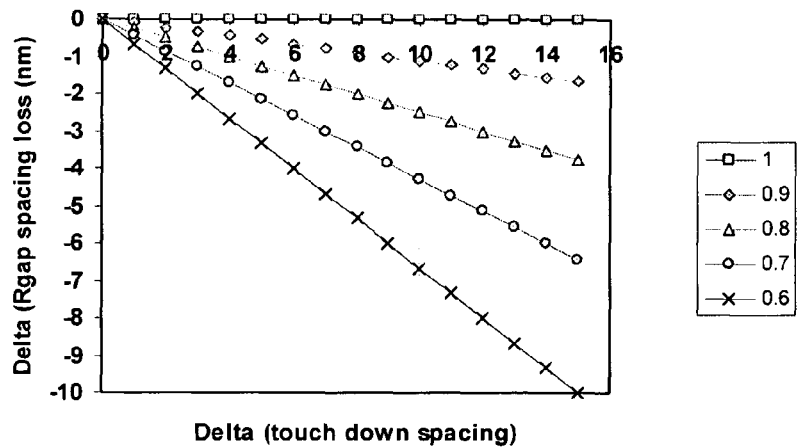
FIG. 6b is a data diagram showing the relationship of the change of the Rgap spacing loss and the change of the touch down spacing.
Figure 6C:
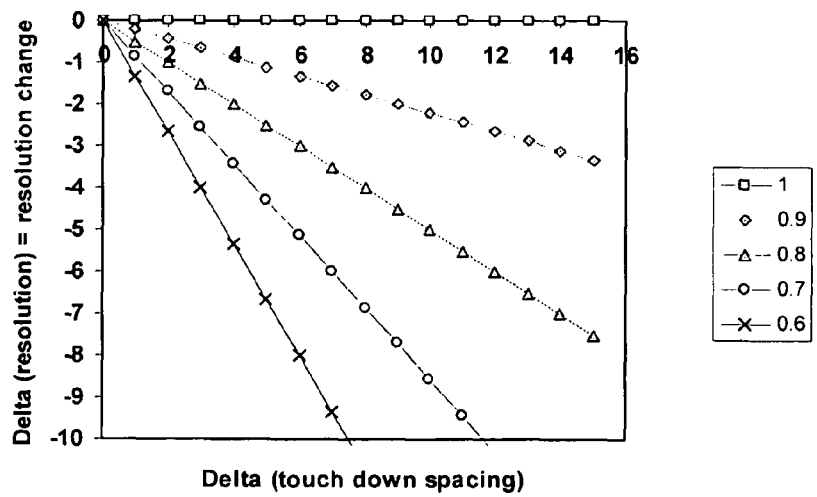
FIG. 6c is a data diagram showing the relationship of the change of resolution and the change of the touch down spacing.

From spacing sensitivity experiment on resolution, we can get the relationship of the resolution value and the Rgap spacing loss. If the backoff amount of the slider is 1 nm, the coefficient K=2, based on experiment data, as shown in FIGS. 6a-6c. Thus, if using the resolution value as the reference value, the equation is:

$$\text{Delta[resolution value]} = 2*\text{Delta[touch down spacing]}*[1/\text{DFH gamma ratio} - 1]$$

In comparison with the prior art, the present method tests the DFH gamma ratio of the slider when it is flying over a rotating disk, and uses the change of resolution instead of absolute resolution value, and as the reader shield gap and initial PTR recess level are giving a constant offset of resolution but not contribute to the change of resolution with varying initial fly-height, so the tested DFH gamma ratio according to the present invention is accurate without other factors. Thus, the present method can clearly identify and differentiate out DFH gamma ratio effect in flying media case and, in turn, greatly benefit on slider design in optimizing both head-disk interference (HDI) and performance.

The reference value also can be pulse-width value or other suitable value.

Figure 7:
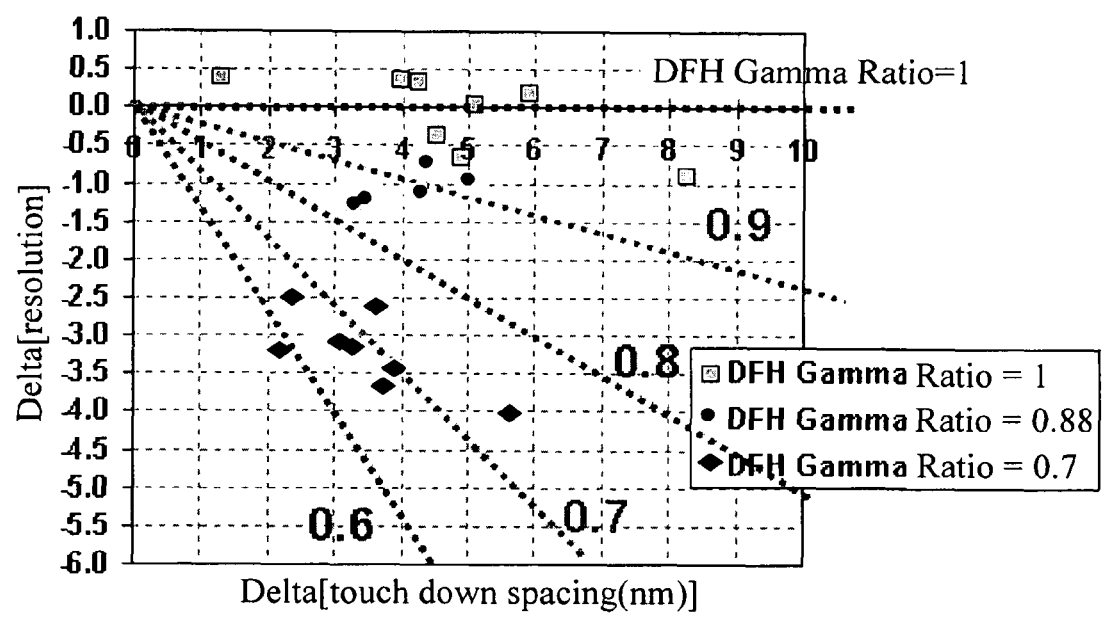
FIG. 7 is a data diagram showing testing results of the DFH gamma ratio of different sliders.

FIG. 7 shows testing results of the DFH Gamma ratio of many different types of sliders. From this graph, the sliders can be judged according to the DFH gamma ratio and then using these data to optimize the slider.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A method for testing performance of a magnetic head slider used in a disk drive unit having a rotatable disk, a read head incorporated in the slider for reading data from the disk, and a fly-height actuator for changing spacing between the disk and the slider, the method comprising the steps of:
   (1) rotating the disk and positioning the slider over the rotating disk at an initial fly-height;
   (2) exciting the fly-height actuator to make the slider touch the disk and recording a touch down spacing of the read head of the slider;
   (3) backing off the slider at a predetermined backoff amount from the disk;
   (4) testing dynamic performance of the slider to obtain a reference value which is related to the spacing between the disk and the slider;
   (5) varying the initial fly-height of the slider;
   (6) repeating the steps (2) to (4) with the backoff amount fixed; and
   (7) calculating a dynamic fly-height gamma ratio based at least in part on the recorded touch down spacing and the obtained reference values.

2. The method as claimed in claim 1, wherein the step (2) is performed by applying an actuator power to the fly-height actuator, and the step (3) is performed by lowering the actuator power by an amount corresponding to the backoff amount.

3. The method as claimed in claim 1, wherein the step (5) is performed by:
   adjusting the slider's Load/Gram,
   adjusting attitude of the slider,
   adjusting z-height of the slider,
   varing an air bearing surface pattern of the slider, and/or
   varying rotation speed of the disk.

4. The method as claimed in claim 1, wherein calculating the dynamic fly-height gamma ratio is performed according to the following equation:

$$\text{Delta [reference value]} = K*\text{Delta [touch down spacing]}*[1/\text{DFH gamma ratio} - 1]$$

wherein Delta [reference value] denotes the reference value change, K denotes an experimental coefficient, Delta [touch down spacing] denotes the touch down spacing change, and "DFH gamma ratio" denotes the dynamic fly-height gamma ratio.

5. The method as claimed in claim 4, wherein the step (4) is resolution measurement, the reference value is resolution value, and resolution value is calculated by the signal amplitude ratio of middle frequency and low frequency.

6. The method as claimed in claim 5, wherein the value of the coefficient K is obtained by spacing sensitive experiment on resolution.

7. The method as claimed in claim 6, wherein coefficient K is 2.

8. The method as claimed in claim 4, wherein the reference value is pulse-width value.

9. The method as claimed in claim 1, wherein the fly-height actuator is located on the slider and is one of a thermal actuator, an electrostatic actuator and a piezoelectric actuator.

* * * * *